Sept. 26, 1967  H. M. WEITZ ETAL  3,344,198
SEPARATING AND RECOVERING CYCLOPENTADIENE
Filed March 4, 1965
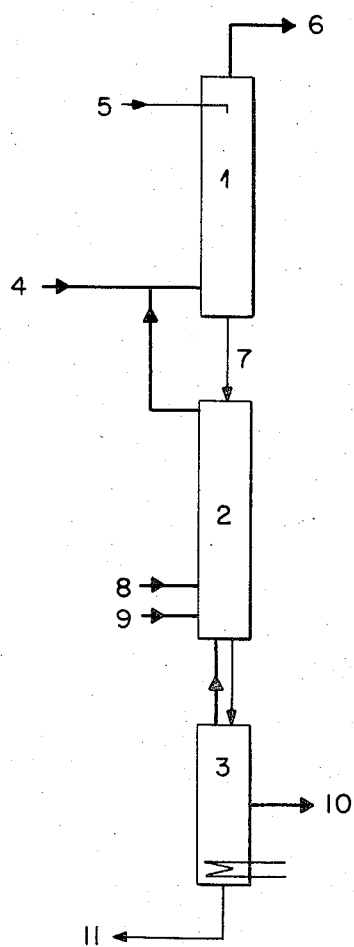
INVENTORS.
HANS-MARTIN WEITZ
HUGO KROEPER
ULRICH WAGNER
JOSEF RITZ
BY 
United States Patent Office 3,344,198
Patented Sept. 26, 1967

3,344,198
SEPARATING AND RECOVERING
CYCLOPENTADIENE
Hans Martin Weitz, Frankenthal, Pfalz, Hugo Kroeper, Heidelberg, Ulrich Wagner, Limburgerhof, Pfalz, and Josef Ritz, Ludwigshafen (Rhine), Germany, assignors to Badische Anilin- & Soda-Fabrik Aktiengesellschaft, Ludwigshafen (Rhine), Germany
Filed Mar. 4, 1965, Ser. No. 437,044
Claims priority, application Germany, Mar. 6, 1964,
B 75,762
7 Claims. (Cl. 260—666)

This invention relates to a process for removing and recovering cyclopentadiene from hydrocarbon mixtures consisting mainly of hydrocarbons having five carbon atoms and containing diolefins.

Almost all $C_5$-hydrocarbon mixtures originating from pyrolytic cracking methods contain not only pentanes, pentenes and open-chain diolefins, such as isoprene and the pentadienes, but also more or less large amounts of cyclopentadiene. Although cyclopentadiene itself is a valuable initial product for many organic intermediates, its presence in $C_5$-cracking fractions is usually very undesirable because it makes difficult the processing of the $C_5$-fraction, for example the isolation of isoprene from the hydrocarbon mixture. Moreover in the presence of isoprene, pentadienes or other reactive compounds, particularly unsaturated compounds, cyclopentadiene tends to undergo not only pure dimerization or trimerization but also the formation of adducts and particularly of high molecular weight polymerization products. It is known that rise in temperature, which usually takes place in the course of processing, accelerates the said processes to a very marked extent.

All hitherto known industrial methods for separating cyclopentadiene from $C_5$-hydrocarbon mixtures are based on a dimerization. For this purpose the $C_5$-mixture is heated for a certain period to temperatures of for example 100° C. and then the dimer fraction is separated under mild conditions.

All the said methods have a number of disadvantages. Thus, for example, the $C_5$-mixture must be present in liquid form, but this is not always so in a plurality of successive distillation steps. Since the dimerization reaction proceeds very slowly towards its end, long residence periods (up to twelve hours) in the dimerization vessel are necessary, and the vessels must consequently have a very large capacity. Moreover the dimer fraction contains a considerable amount of isoprene and pentadienes in chemically combined form. Although the thermal cracking of dicyclopentadiene proceeds at an adequate rate at temperatures above 140° C., recracking of the reaction products of cyclopentadiene with isoprene and pentadienes and the cracking of dimerization products of isoprene require temperatures of more than 500° C.

The methods of extractive distillation or countercurrent gas scrubbing by means of selective solvents are already known for the separation of isoprene from $C_5$-hydrocarbon mixtures. Isoprene and cyclopentadiene are first taken up by the solvent. If a certain dilution of the hydrocarbons by the solvent occurs in this method, isoprene and cyclopentadiene remain together in the stripping zone for the isoprene for a long time in a hot part of the apparatus. Depending on the concentrations at this point, dimerization readily takes place and in particular a troublesome resin is easily formed.

It is an object of the invention to provide a process for the separation of cyclopentadiene from $C_5$-distillation fractions, especially from isoprene. It is another object of the invention to provide a process for the separation of cyclopentadiene without loss of cyclopentadiene and/or valuable $C_5$-components. It is a further object of the invention to provide a process for the separation of cyclopentadiene which can be carried out with a high space-time yield. It is finally an object of the invention to provide a process for the recovery of cyclopentadiene as a valuable compound. These and other objects and advantages of the invention will be apparent from the following detailed description in connection with the accompanying diagrammatical drawing.

We have now found that cyclopentadienes may be separated and isolated by treatment with a selective solvent without the said difficulties from hydrocarbon mixtures mainly consisting of hydrocarbons having five carbon atoms and containing diolefins by removing the cyclopentadiene by preliminary washing with a small amount of a selective heterocyclic solvent having a nitrogen atom or an oxygen atom as the heteroatom and only one carbonyl group adjacent to the heteroatom, by the countercurrent principle prior to absorption of the diolefin with the selective solvent, the ratio of the hydrocarbon mixture to the said small amount of heterocyclic solvent being such that under the temperature and pressure conditions chosen it is substantially only cyclopentadiene that is absorbed, removing this small amount of heterocyclic solvent after it has been loaded with cyclopentadiene and supplying it to a countercurrent column where it is brought into contact with a liquid or gaseous inert compound, the amount of the said liquid or gaseous compound only being such that the dissolved diolefin (but not the cyclopentadiene) is removed from the heterocyclic solvent, withdrawing the liquid or gaseous compound at the middle or upper portion of the countercurrent column, supplying the heterocyclic solvent containing cyclopentadiene to a third column (a stripping column), there expelling the cyclopentadiene and withdrawing it at the upper portion of the column and if desired reusing the heterocyclic solvent free from hydrocarbons.

A number of advantages is achieved in the method according to this invention over the prior art methods of cyclopentadiene separation; the $C_5$-mixture may be used in gaseous or liquid form, the process proceeds rapidly, and there are no appreciable losses of isoprene and/or pentadienes.

The process may be used for separating cyclopentadiene from the most varied $C_5$-hydrocarbon mixtures. For example $C_5$-hydrocarbon fractions may be separated which have been isolated from hydrocarbon mixtures obtained by thermal or catalytic cracking processes or by dehydrogenation processes. These hydrocarbon mixtures may contain very different components. The following may be given as examples: pentanes, cyclopentane, pentenes, methylbutenes and cyclopentene, isoprene, pentadienes, cyclopentadiene and also $C_4$- and $C_5$-acetylenes lying within the boiling range, for example butyne-2, 3-methyl-butyne-1, pentyne-1, 2-methylbutene-(1)-yne-(3).

A typical mixture originating from a pyrolysis process and from which cyclopentadiene may be separated by the claimed process, has about the following composition:

n-Pentane—2–80 vol. percent, particularly 5–40 vol. percent
i-Pentane—2–80 vol. percent, particularly 5–40 vol. percent
Cyclopentane—0.5–20 vol. percent, particularly 1–10 vol. percent
n-Pentene—2–80 vol. percent, particularly 5–40 vol. percent
i-Pentene—2–80 vol. percent, particularly 5–40 vol. percent
Cyclopentene—0.5–30 vol. percent, particularly 1–15 vol. percent Isoprene—1–50 vol. percent, particularly 2–30 vol. percent Pentadiene—1–50 vol. percent, particularly 2–30 vol. percent Cyclopentadiene—0.1–50 vol. percent, particularly 1–30 vol. percent Butyne-2—0.01–10 vol. percent, particularly 0.02–5 vol. percent $C_5$-acetylenes—0.01–10 vol. percent, particularly 0.02–5 vol. percent $C_4$-hydrocarbons and lower ones—0.5 vol. percent, particularly 0.01–1 vol. percent $C_6$-hydrocarbons and higher ones—0–5 vol. percent, particularly 0.01–1 vol. percent However, hydrocarbon mixtures whose composition is outside these limits and mixtures which contain further hydrocarbons and other compounds (e.g. sulfur-containing compounds, ether or other oxygen-containing compounds) are also suitable for the process according to this invention.

It is preferred to use the same selective solvent for the preliminary washing (i.e. for the separation of cyclopentadiene) and for the following main extraction (i.e. the separation of the diolefin). Suitable solvents are e.g. heterocyclic solvents having four to six, particularly five, ring members, the heterocyclic compounds containing a nitrogen atom or an oxygen atom as the heteroatom and a carbonyl group vicinal to the heteroatom. The carbonyl group may be in the ring or outside the ring of the heterocyclic compound. For example the following compounds may be used: lactams, lactones, N-acylpyrrolidines or N-acylpiperidines. Examples of particularly suitable selective solvents of this type are: butyrolactone and its C-alkyl derivatives; pyrrolidone and its N-alkyl derivatives, as for example N-methylpyrrolidone, N-ethylpyrrolidone, N-isobutylpyrrolidone and also N-(2-hydroxyethyl)-pyrrolidone; N-formylpyrrolidine; and pyrrolidones bearing alkyl groups as substituents on the carbon atoms of the ring. Where alkyl groups are present as substituents on carbon or nitrogen atoms, or acyl groups on nitrogen atoms, of the heterocyclic compounds, they usually contain one to four carbon atoms. β-propiolactones or β-propiolactams and also the corresponding compounds having five carbon atoms in the ring, for example valerolactone, valerolactam and N-formylpiperidine, are also suitable. The solvent may be used in pure form. It may also be used however with the addition of a certain amount of water (for example up to 40%, preferably up to 20%). Although these additions decrease the solvent power, they increase selectivity. In some cases it may be advantageous to use mixtures of solvents.

In principle it is possible to use another solvent, for example sulfolane or acetonitrile, for the subsequent separation of the diolefins, i.e. of isoprene from the other $C_5$-hydrocarbons, although in general it is not as useful as using the same solvent in both cases.

The amount of solvent used for the preliminary washing is such that substantially only cyclopentadiene is taken up. Rigid limits to the ratios cannot be given because they are affected by many factors. In principle the necessary amount of solvent can be ascertained in accordance with the conventional rules from the Bunsen adsorption coefficients (also known as α-values) of cyclopentadiene and the other hydrocarbons present in the mixture in the solvent in question at the temperature and pressure in question. If the α-values are not known, they may be determined by known methods. Regard should be had to whether it is desired to effect only a partial removal of cyclopentadiene or to carry out separation as completely as possible. The temperature and pressure at which the extraction of the cyclopentadiene is carried out (i.e. whether the extraction is carried out as absorption from the vapor phase or from the liquid phase) are also factors to be borne in mind, as already stated. In general temperatures of 0° to 150° C. and pressures of 1 to 10 atmospheres gauge will prove to be suitable.

The number of trays in the column used also affects the amount of solvent to be used. As a guide it may be stated that when using a column having fifteen theoretical trays at 50° C. and a pressure of 1 atmosphere absolute (i.e. with absorption from the gas phase), from 5 to 50 cu. m./h. of N-methylpyrrolidone having a water content of 5% may be used for the preliminary washing for the extraction of 1000 cu. m. (S.T.P.) per hour of $C_5$-hydrocarbon mixture.

As the number of theoretical trays in the column is decreased, the amount of solvent required increases, and when the number of theoretical trays is increased, the amount of solvent required decreases. The amount of solvent must be about doubled or halved when the temperature is increased or lowered by 15° C.

When using anhydrous N-methylpyrrolidone, the amount of solvent may be decreased by 20 to 40%. When using N-methylpyrrolidone containing 10% of water it should be raised by 20 to 40%.

When the pressure is doubled, the amount of solvent under otherwise the same conditions is halved, and vice versa.

About the same ratios are used when using pyrrolidone, N-ethylpyrrolidone, formylpyrrolidone or butyrolactone. Much the same is true of the other solvents.

The process will now be described with reference to the accompanying drawing which illustrates diagrammatically an embodiment of apparatus suitable for use in the process:

The $C_5$-hydrocarbon mixture to be subjected to one of the known countercurrent extraction methods, for example by absorption from the gas phase, a liquid-liquid extraction or an extractive distillation with the heterocyclic compound, is supplied through line 4 to a column 1 and brought into contact therein with solvent supplied at 5. The relative proportions, temperature and pressure are maintained in accordance with the statements made above concerning the number of theoretical trays. The cyclopentadiene and a small amount of diolefins are taken up by the heterocyclic compound and the remaining $C_5$-hydrocarbon mixture (which contains the bulk of the pentanes, pentenes and diolefins and any butyne-2 and $C_5$-acetylenes) is led away at the top of the column 1 to 6 and supplied to the main extraction.

The heterocyclic solvent loaded with cyclopentadiene and a small portion of other $C_5$-hydrocarbons is supplied through a line 7 to a second column 2. In it the said solution flows countercurrent to a stripping gaseous or liquid medium; it is simplest to use for this purpose a portion of the cyclopentadiene liberated in this or a subsequent section of the column. Hydrocarbons which are less soluble in the solvent than isoprene and pentadiene, for example alkanes having one to six carbon atoms and alkenes having two to five carbon atoms, may however also be used. It may be advantageous to use hydrocarbons, such as pentane and/or pentenes (including methylbutenes), obtained in a subsequent separation process in which isoprene is isolated in pure form. Nitrogen or steam may also be used as stripping gases. When extraneous gases (i.e. other than cyclopentadiene which is liberated in column 2) are used, they may be admitted for example at 8 or 9. When using steam, the advantage may be utilized that direct heating of this column is thus caused so that expelling the diolefins is facilitated by a rise in temperature. Obviously two or more of these measures may be combined. The gas or liquid which is supplied to the countercurrent or concentrating column serves mainly for expelling isoprene and pentadienes. The amount of stripping medium supplied should be proportionate. In this case, too, the most favorable amount can be calculated on the basis of the Bunsen adsorption coefficients. For example if the countercurrent column can be operated at about 1 atmosphere absolute and a temperature of 50° to 60° C. using N-methylpyrrolidone containing 5% of water, an amount of stripping gas of about 100 to 200 cu. m. (S.T.P.) of gas per cu. m. of solvent is necessary. The amount is higher or lower depending on the solubility of the dienes in the solvent. The supplied substances leave countercurrent column 2 with the expelled diene. The mixture thus obtained is advantageously returned to the initial mixture unless it is passed direct into the main extraction stage.

The solution flowing down from the countercurrent column 2 is supplied to a third column, the stripping column 3, in which cyclopentadiene and any water present are expelled by a suitable measure, preferably by heating, by decreasing the pressure or by stripping with an inert gas, for which steam is preferably used. Pentanes, butanes, pentenes and/or butenes may also be used. Any other dissolved substances which have been entrained from the countercurrent column also escape from the solvent. All these substances are withdrawn from the upper end of the third column. They may be supplied again to the lower end of the countercurrent column, but it may also be advantageous to remove this mixture of substances from the separation process; in this case the mixture is washed with water to remove traces of solvent. If the cyclopentadiene is required pure and pentenes or hydrocarbons other than cyclopentadiene are used for the countercurrent effect, it is isolated at a lower point in the stripper through a side discharge, e.g. at 10. The cyclopentadiene is also washed with a small amount of water to remove solvent residues. If the products are withdrawn in gas phase, the stream of gas may also be washed with the appropriate condensed hydrocarbons to remove solvent vapor. At the bottom of the stripper column (which as a rule is kept at the boiling point of the solvent) a solvent practically free from hydrocarbons is obtained which may contain a certain amount of dicyclopentadiene and tricyclopentadiene. The solvent is withdrawn at 11. The bulk or the whole of the solvent is returned to the first column, while a small part may be regenerated by distillation preferably at subatmospheric pressure, the dicyclopentadiene being recovered. It is advantageous to keep the content of dicyclopentadiene in the bottoms of the stripper column below 5% by appropriate combination of the amount withdrawn. The heat of the solvent in the bottoms of the stripper column may be used by heat exchange either for heating up fresh solvent or for evaporating any liquid initial material. It may be advantageous to operate the whole separating process at a constant pressure. In some cases however it is favorable to operate the washing and countercurrent portions or the countercurrent and stripper portions of the plant at different pressures. This method requires a compressor if gas is to be conveyed from one column at a lower pressure into one at a higher pressure.

Instead of the fractionated absorption and desorption described above, extractive distillation carried out in an analogous way may be employed. It is also possible to use liquid-liquid extraction.

In addition to the selective solvents according to this invention, a second solvent (preferably a hydrocarbon) which is immiscible or only sparingly miscible with the selective solvent may be used as the second phase, the $C_5$-hydrocarbon mixture to be processed being distributed between the two phases ("countercurrent distribution"). If the second solvent is not added, the second phase is formed by those hydrocarbons in the mixture which are only sparingly soluble in the selective solvent.

It is preferred to carry out the separation of the cyclopentadiene in an extraction column, the mixture to be processed being introduced either at the middle or, when working without a second solvent, at the bottom, the selective solvent at the top and the second solvent, if any, at the bottom. At the bottom of the column, where the selective solvent loaded with cyclopentadiene leaves, a so-called antisolvent, e.g. water, may be added. It may be advantageous to employ the back-wash process using either a compound which is insoluble or only sparingly soluble in the solvent or the isolated extracted material, i.e. cyclopentadiene. All conventional types of extraction column, such as columns having mixing and separating zones, packed or perforated-plate columns with or without pulsation means, are suitable for the process according to this invention. However, all machines or centrifuges conventionally used for extraction and countercurrent distribution and all processes using separate mixing and separating systems are also suitable.

It is also possible to combine the various processes, e.g. a fractional absorption-desorption with a liquid-liquid extraction.

The invention will now be described in the following examples given with reference to the accompanying drawing.

EXAMPLE 1

An apparatus as shown diagrammatically in the drawing has a seaprating column 1 having a height of 10 meters and a diameter of 150 mm. which is filled with tower packing. A $C_5$-hydrocarbon mixture (originating from a pyrolysis process and containing 5% by weight of cyclopentadiene, 12% by weight of isoprene, 11% by weight of cis- and trans-pentadiene-1,3, about 60% by weight of pentenes and about 12% by weight of pentanes) is passed at 4 into the bottom of the column 1 at the rate of 10 cubic meters (S.T.P.) per hour. 220 liters per hour of N-methylpyrrolidone having a water content of 5% by weight and a temperature of about 40° C. is passed into the top of the column 1 through line 5. The gas mixture occurring at the top of the column 1 at 6 contains about 0.1% by weight of cyclopentadiene, the bulk of cis- and trans-pentadiene-1,3 and practically the whole amount of isoprene and the other components of the mixture. The solution occurring at the bottom of the column is passed into a second separating column 2 which has the same dimensions as the absorption column 1. A gaseous stream of pentanes and pentenes is passed into the lower end of the column 2 at 8 at the rate of about 12 cubic meters (S.T.P.) per hour and steam is passed in at 9 at the rate of 3 cubic meters (S.T.P.) per hour. This stream of pentanes and pentenes originates from a subsequent separation process in which these paraffins and olefins are separated from the dienes by means of N-methylpyrrolidone. The solution is heated to about 140° C. in a desorption column 3 having a diameter of 10 mm. and a length of 5 meters which is arranged behind the separating column 2. From the middle of column 3, at 10, a gas stream is withdrawn which contains steam, cyclopentadiene and about 10% of the piperylenes contained in the initial material. The solvent freed from dissolved gases is removed from the bottom of the column 3 at 11. It is expedient to reuse it. In this case it is advantageous to purify a portion of the withdrawn solvent by fractional distillation under subatmospheric pressure, a small amount of cyclopentadiene thus being recovered in its dimerized form.

EXAMPLE 2

An apparatus essentially as shown diagrammatically in the drawing has a separating column 1 having a height of 10 meters and a diameter of 150 mm. which is filled with tower packing. A $C_5$-hydrocarbon mixture (originating from a pyrolysis process and containing 8% by weight of cyclopentadiene, 12% by weight of isoprene, 11% by weight of cis- and trans-pentadiene-1,3, about 24% by weight of pentenes and about 45% by weight of pentanes) is passed into the bottom of the column 1 at the rate of 5 cubic meters (S.T.P.) per hour. 300 liters per hour of N-hydroxyethylpyrrolidone having a water content of 5% by weight and a temperature of about 60° C. is passed into the top of the column. The gas mixture occurring at the top of the column contains about 0.05% by weight of cyclopentadiene, the bulk of cis- and trans-pentadiene-1,3 and practically the whole amount of isoprene and the other components of the mixture. The solution occurring at the bottom of the column is passed into a second separating column 2. In the desorption column 3 the solvent is degassed by heating to the boiling point. The gas mixture occurring at the top of this column is passed into the lower end of the second separating column 2. From the middle of desorption column 3 a gas stream is withdrawn which contains steam, cyclopentadiene (monomeric and dimeric) and a small amount (about 2%) of the pentadienes contained in the initial material. The solvent freed from dissolved gases is withdrawn from the bottom of the column 3. It is expedient to reuse it. In this case it is advantageous to purify a portion of the withdrawn solvent by fractional distillation under subatmospheric pressure, a small amount of cyclopentadiene thus being recovered in its dimeric form.

EXAMPLE 3

The same apparatus as in Example 2 is used. A $C_5$-hydrocarbon mixture (originating from a pyrolysis process and containing 8% by weight of cyclopentadiene, 12% weight of isoprene, 11% by weight of cis- and trans-pentadiene-1,3, about 24% by weight of pentenes and about 45% by weight of pentanes) is passed into the bottom of the first separating column at the rate of 10 cubic meters (S.T.P.) per hour. 150 liters per hour of butyrolactone having a water content of 5% by weight and a temperature of about 40° C. is passed into the top of the column. The gas mixture occurring at the top of the column contains less than 0.1% of cyclopentadiene, the bulk of cis- and trans-pentadiene-1,3 and practically the whole amount of isoprene and the other components of the mixture. The solution occurring at the bottom of the column is passed into the second separating column. The solution is heated to about 140° C. in the desorption column. The gas mixture occurring at the top of this column is passed into the lower end of the second separating column. From the middle of the column a gas stream is withdrawn which contains steam, cyclopentadiene and a small amount of the pentadienes contained in the initial material. The solvent freed from dissolved gases is withdrawn from the bottom of the column. It is expedient to reuse it. In this case it is advantageous to purify a portion of the withdrawn solvent by fractional distillation under subatmospheric pressure, a small amount of cyclopentadiene thus being recovered in its dimeric form.

EXAMPLE 4

The same apparatus as in Example 2 is used. A $C_5$-hydrocarbon mixture (originating from a pyrolysis process and containing 12% by weight of cyclopentadiene, 9% by weight of isoprene, 12% by weight of cis- and trans-pentadiene-1,3, about 25% by weight of pentenes and about 42% by weight of pentanes) is passed into the bottom of the first separating column at the rate of 10 cubic meters (S.T.P.) per hour. 220 liters per hour of valerolactam having a water content of 5% by weight and a temperature of about 40° C. is passed into the top of the column. The gas mixture occurring at the top of the column contains about 0.1% of cyclopentadiene, the bulk of cis- and trans-pentadiene-1,3 and practically the whole amount of isoprene and the other components of the mixture. The solution occurring at the bottom of the column is passed into the second separating column. In the desorption column the solvent is degassed by boiling. The gas mixture occurring at the top of the column is passed into the lower end of the second separating column. From the middle of the degassing column a gas stream is withdrawn which contains steam, cyclopentadiene and a small amount of the pentadienes contained in the initial material. The solvent freed from dissolved gases is withdrawn from the bottom of this column. It is expedient to reuse it. In this case it is advantageous to purify a portion of the withdrawn solvent by fractional distillation under subatmospheric pressure, a small amount of cyclopentadiene thus being recovered in its dimeric form.

EXAMPLE 5

The same apparatus as in Example 2 is used. A $C_5$-hydrocarbon mixture (originating from a pyrolysis process and containing 15% by weight of cyclopentadiene, 11% by weight of isoprene, 12% by weight of cis- and trans-pentadiene-1,3, about 23% by weight of pentenes, about 39% by weight of pentanes and about 0.1% by weight of butyne-2) is passed into the bottom of the first separating column at the rate of 10 cubic meters (S.T.P) per hour. 120 liters per hour of N-formylpyrrolidine having a water content of 5% by weight and a temperature of about 40° C. is passed into the top of the column. The gas mixture occurring at the top of the column contains about 0.1% by weight of cyclopentadiene and practically the whole amount of cis- and trans-pentadiene-1,3, isoprene, butyne-2 and the other components of the mixture. The solution occurring at the bottom of the column is passed into the second separating column. In the desorption column the solvent is degassed by heating to the boiling point. The gas mixture occurring at the top of the desorption column is passed into the lower end of the second separating column. From the middle of the desorption column a gas stream is withdrawn which contains steam and cyclopentadiene (monomeric and dimeric) having a purity of about 98%. The solvent freed from dissolved gases is withdrawn from the bottom of this column. It is expedient to reuse it. In this case it is advantageous to purify a portion of the withdrawn solvent by fractional distillation under subatmospheric pressure, a small amount of cyclopentadiene thus being recovered in its dimeric form.

EXAMPLE 6

The same apparatus as in Example 2 is used. A $C_5$-hydrocarbon mixture (originating from a pyrolysis process and containing 8% by weight of cyclopentadiene, 12% by weight of isoprene, 11% by weight of cis- and trans-pentadiene-1,3, about 24% by weight of pentenes and about 45% by weight of pentanes) is passed into the bottom of the first separating column at the rate of 10 cubic meters (S.T.P.) per hour. 100 liters per hour of $\beta$-propiolactone at a temperature of about 40° C. is passed into the top of the column. The gas mixture occurring at the top of the column contains about 0.1% of cyclopentadiene, the bulk of cis- and trans-pentadiene-1,3 and practically the whole amount of isoprene and the other components of the mixture. The solution occurring at the bottom of the column is passed into the second separating column. In the desorption column the solvent is degassed by heating to the boiling point. The gas mixture occurring at the top of the desorption column is passed into the lower end of the second separating column. From the middle of the desorption column a gas stream is withdrawn which contains cyclopentadiene and a small amount of the pentadienes contained in the initial material. The solvent freed from dissolved gases is withdrawn from the bottom of this column. It is expedient to reuse it. In this case it is advantageous to purify a portion of the withdrawn solvent by fractional distillation under subatmospheric pressure, a small amount of cyclopentadiene thus being recovered in its dimeric form.

We claim:
1. A process for separating and isolating cyclopentadiene from hydrocarbon mixtures containing diolefins and consisting mainly of hydrocarbons having five carbon atoms which process comprises removing the cyclopentadiene by a preliminary washing with a small amount of a selective heterocyclic solvent selected from the group consisting of lactams having 4 to 6 ring members, lactones having 4 to 6 ring members, N-alkyllactams with

4 to 6 ring members and 1 to 4 carbon atoms in the N-alkyl, β-hydroxyalkyllactams with 4 to 6 ring members and 2 to 4 carbon atoms in the N-hydroxyalkyl, and N-acyl saturated cyclic amines with 5 to 6 ring members and 1 to 3 carbon atoms in the N-acyl by the countercurrent principle prior to absorption of the diolefin with said selective solvent, the ratio of the hydrocarbon mixture to the said small amount of heterocyclic solvent being such that under the temperature and pressure conditions chosen it is substantially only cyclopentadiene that is absorbed, removing said small amount of heterocyclic solvent after it has been loaded with cyclopentadiene and supplying it to a countercurrent column where it is brought into contact with an inert non-solid compound, the amount of said inert non-solid compound being such that only the dissolved diolefins (but not the cyclopentadiene) are removed from the heterocyclic solvent, withdrawing the added inert compound containing the diolefins dissolved therein but not the cyclopentadiene at the upper portion of the countercurrent column, supplying the heterocyclic solvent containing cyclopentadiene to a stripping zone in which the cyclopentadiene is expelled and withdrawing it at a suitable point from the stripping zone.

2. A process as claimed in claim 1 wherein a selective heterocyclic solvent is used which contains up to 40% of water.

3. A process as claimed in claim 1 wherein the selective solvent is N-methylpyrrolidone.

4. A process as claimed in claim 1 wherein the selective solvent is β-hydroxyalkylpyrrolidone.

5. A process as claimed in claim 1 wherein the selective solvent is propiolactone.

6. A process as claimed in claim 1 wherein the selective solvent is N-formylpyrrolidine.

7. A process as claimed in claim 1 wherein the selective solvent is butyrolactone.

References Cited

UNITED STATES PATENTS

| | | | |
|---|---|---|---|
| 2,426,705 | 9/1947 | Paterson et al. | 202—395 |
| 2,707,716 | 5/1955 | Price | 260—666 |
| 2,737,538 | 3/1956 | Nelson | 260—666 |
| 2,771,494 | 11/1956 | Weedman | 260—666 |
| 3,075,025 | 1/1963 | Henke et al. | 260—666 |
| 3,169,998 | 2/1965 | Rylander et al. | 260—666 |

FOREIGN PATENTS 1,153,738  9/1965  Germany.

OTHER REFERENCES

Chemical Abstracts, vol. 59, 8505b.

DELBERT E. GANTZ, *Primary Examiner.*

V. O'KEEFE, *Assistant Examiner.*

UNITED STATES PATENT OFFICE
CERTIFICATE OF CORRECTION

Patent No. 3,344,198                              September 26, 1967

Hans Martin Weitz et al.

It is hereby certified that error appears in the above numbered patent requiring correction and that the said Letters Patent should read as corrected below.

Column 3, line 11, for "0.5" read -- 0-5 --; column 4, line 46, for "to" read -- at --.

Signed and sealed this 20th day of May 1969.

(SEAL)
Attest:

Edward M. Fletcher, Jr.
Attesting Officer

Commissioner of Patents